INVENTORS
Charles B. Bartley
Virgil H. Dake
By Brown & Critchlow
their Attorneys.

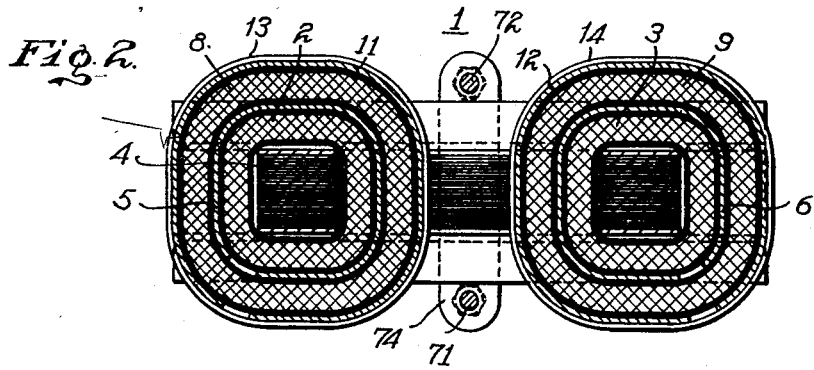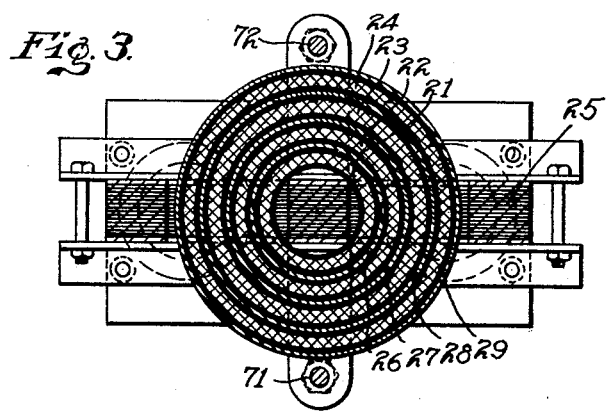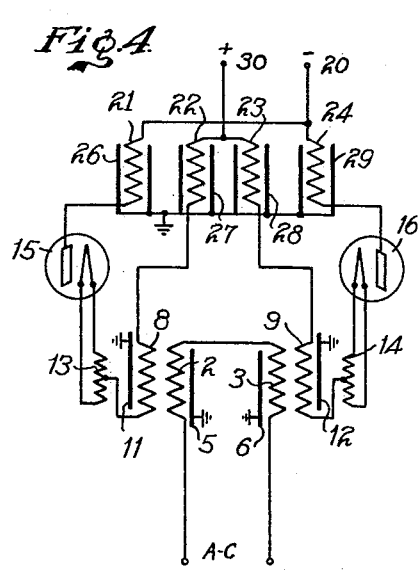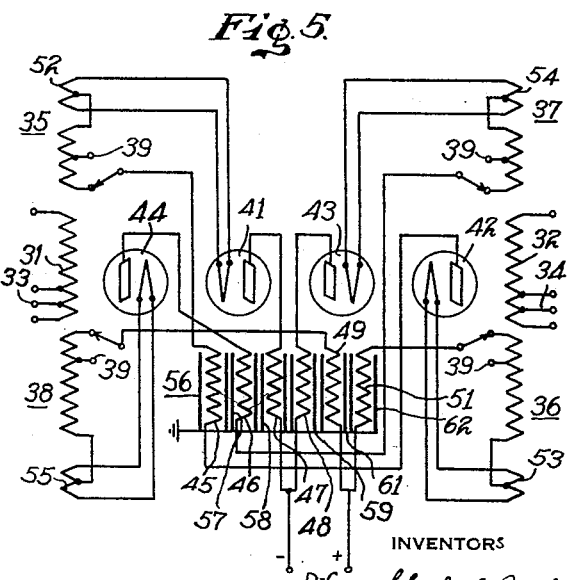

UNITED STATES PATENT OFFICE

CHARLES B. BARTLEY AND VIRGIL H. DAKE, OF PITTSBURGH, PENNSYLVANIA

CURRENT-RECTIFYING APPARATUS

Application filed November 14, 1928. Serial No. 319,276.

This invention relates to rectifiers of the type utilized for converting alternating electric currents into direct currents, and more especially to an improved rectifier which is adapted to produce a direct current that is substantially free from all pulsation ripples and current variations of that character.

There are many applications today for rectifiers where it is essential that the direct current produced by them be free from even small pulsations or ripples. This is especially true where the currents produced by the rectifiers are employed in certain radio, telephone and relay circuits, as it is necessary for the satisfactory operation of the apparatus in such circuits that a constant unvarying source of direct current be provided. While at present rectifiers are being used quite extensively in circuits of the type just referred to, and in many others in which a substantially constant direct current is required, nevertheless there is still much to be desired in the nature of the smoothness of the direct currents produced by the rectifiers.

The object of this invention, therefore, primarily is to provide a rectifier which is comparatively simple in construction, efficient in operation and capable of converting ordinary alternating current into direct current, which as far as is detectable is substantially free from any pulsations, ripples or current variations of that character.

Figure 1:
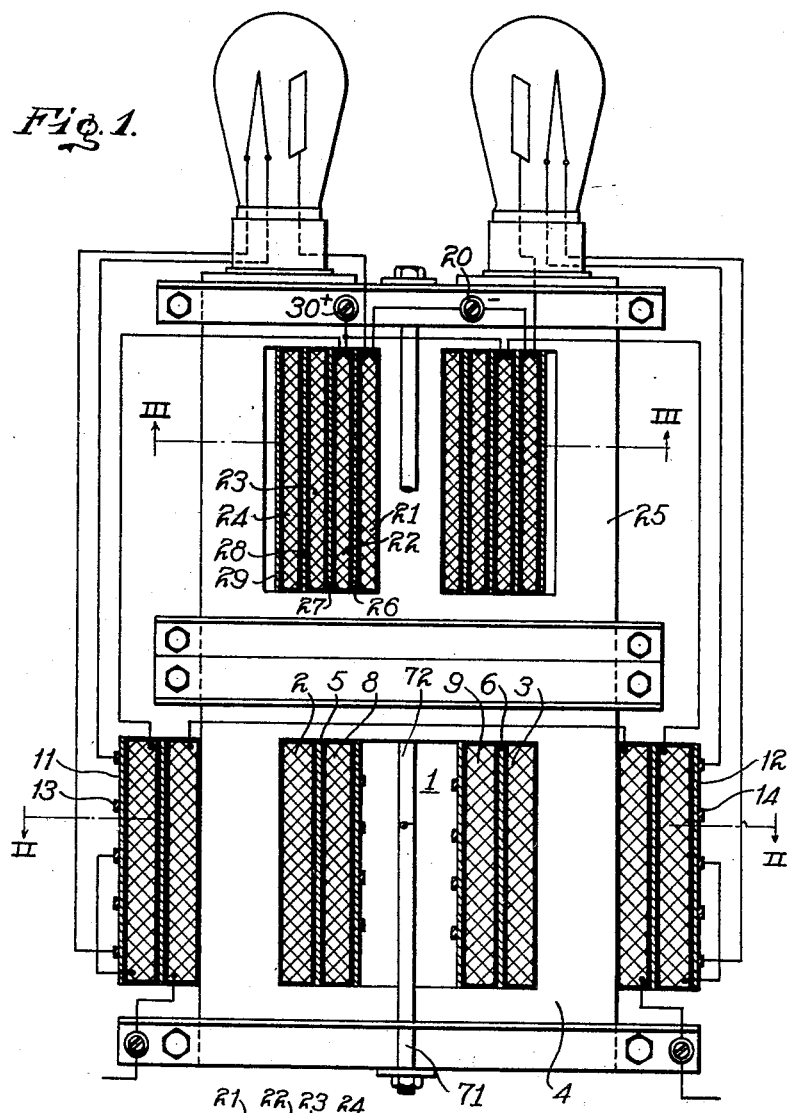

Other objects will becomes apparent and a better understanding of the invention will be had when the following detailed description is read in conjunction with the accompanying drawings, in which Fig. 1 is a view partly in front elevation and partly in section of a current rectifying unit embodying the preferred form of our invention; Fig. 2 a cross section of the rectifier taken on the line II—II of Fig. 1; Fig. 3 a section taken through the reactance coils and the permeable core upon which they are mounted, along the line III—III of Fig. 1; Fig. 4 a schematic circuit diagram of the invention employing two rectifying tubes; Fig. 5 a view similar to that shown in Fig. 4 illustrating another modification of the invention; and Fig. 6 another view of the invention schematically illustrating the way the reactance coils are arranged upon the permeable core of the reactance unit.

Referring now to the drawings in which the preferred embodiment of the invention is illustrated, there is shown a transformer 1 having a primary winding divided into two sections 2 and 3 which are wound on opposite legs of a permeable core 4. Around these windings are provided metal shields 5 and 6, respectively, which are grounded to the frame of the rectifier for the purpose of reducing the electrostatic induction and coupling between the primary and secondary windings of the transfer. These shields are preferably made of copper in the form of bands which are arranged to substantially circumscribe windings 2 and 3. Sufficient space, however, is allowed between the ends thereof to prevent their functioning as short circuited secondary windings. Mounted in concentric relation with sections 2 and 3 respectively of the primary windings and outside of shields 5 and 6 are two secondary windings 8 and 9 which are also protected by a set of shields 11 and 12, having the same characteristics as shields 5 and 6, and being assembled with sufficient space between their ends to prevent them from functioning as short circuited secondaries. Outside of these shields there are mounted a pair of auxiliary tube filament energizing secondary windings 13 and 14 which are made up of a few turns of preferably ribbon-like low resistance wire spread from one end of the transformer to the other.

Figure 6:
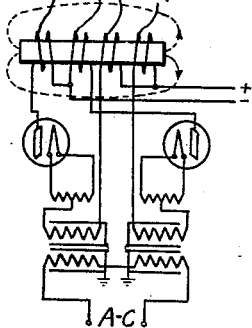

As illustrated in Figs. 1, 4 and 6, two tubes 15 and 16 of the well known Fleming valve type may be employed to adapt the rectifier to the rectification of both the positive and negative half cycles of an alternating current. The filaments of the tubes are connected directly in series circuit relation with auxiliary secondary windings 13 and 14 respectively and are accordingly heated to ionic emission condition thereby. However, it will be understood that although these auxiliary secondary windings afford a very satisfactory and convenient way for energizing the filaments of the tubes employed in the rectifier, they may be otherwise energized.

The rectifying circuits through the tubes are completed by connecting one end of each of secondary transformer windings 8 and 9 to the center point of auxiliary windings 13 and 14, respectively. It has been found that by connecting the transformer secondary windings to the center points of the cathode energizing windings that a much better rectifying result is obtained from the tubes than there is when the connection is made at one end of the filament energizing winding. In the rectifying circuits there is provided a system of reactance coils which are adapted to effectively damp out any pulsations and fluctuations tending to occur in the rectified direct current. This damping system comprises reactance coils 21, 22, 23 and 24, which, as illustrated in Figs. 1, 3 and 4, are concentrically mounted one on top of the other on a permeable core 25, which for the purpose of minimizing the magnetic reluctance of the magnetic circuit is constructed in the shape illustrated. These coils are connected in the rectifying circuits in the following novel manner. One end of each of coils 21 and 24 is connected to a negative terminal 20 of the rectifier and the other end of each is connected to the anodes of tubes 15 and 16, and one end of each of reactance coils 22 and 23 is connected to a positive terminal 30 of the rectifier and the other end of each is connected in the direct current circuit positive ends of transformer secondary windings 8 and 9. The direct current circuit thus provided through tube 15 may be traced from negative terminal 20 of the rectifier through reactance coil 21, tube 15, auxiliary winding 13, secondary winding 8, and reactance coil 22 to positive terminal 30. A similar circuit is provided for tube 16 which extends from negative terminal 20 through reactance coil 24, tube 16, auxiliary winding 14, secondary winding 9 and reactance coil 23 to positive terminal 30.

Around reactance coils 21, 22, 23 and 24 there are provided metallic shields 26, 27, 28 and 29, respectively, which are grounded to the rectifier frame and function to reduce the electrostatic induction and coupling between the reactance coils. As here shown, these shields may be made continuous to form a short circuited secondary winding around each reactance coil. When so formed they tend to resist any variation in the magnetic field surrounding the coils in the well known manner. Consequently, they assist the reactance coils in preventing any rapid changes in value, of the current flowing in the direct current circuits.

In tubes or valves of the Fleming type commonly employed in rectifiers of this character, the plates or anodes of the valves frequently become heated to such an extent that an ionic condition is created in them which permits current to flow through the tubes in a direction opposite to which it is intended. When this happens fluctuations are caused in the current flowing through the tubes which injures their filaments and shortens their life. Also when current flows in a rectifier in this way it detracts from that which should flow in the direct current output circuit, and decreases the efficiency of the rectifier. To prevent such deleterious actions taking place in our rectifier, reactance coils 21, 22, 23 and 24 are so arranged on the permeable core 25 that the normal flow of current through tubes 15 or 16 causes a magnetic field to be produced around core 25 which is always in one direction. Accordingly, the effect of the magnetic field thus provided is to resist the flow of any current in the opposite direction in any of the reactance coils or tubes. Assume for the instant that current is flowing in the circuit extending from negative terminal 20, Figs. 4 and 6, through reactance coils 21, tube 15, winding 8 and reactance coil 22 to positive terminal 30. There will be a tendency for a part of the current to divide and to flow from positive terminal 30, through reactance coil 23, through tube 16 in the wrong direction, and thence through reactance coil 24 to negative terminal 20. For the current to flow in the circuit in this manner as stated above, it must set up a magnetic field to overcome the magnetic field surrounding the coils 21 and 22. Consequently, any tendency for the current to flow backwardly through tube 16 on one-half cycle of rectification, or through tube 15 on the other half cycle, is adequately taken care of by the magnetic field set up by the reactance coils themselves.

Referring more particularly to Fig. 5, a circuit is shown illustrating a modification of our invention in which the primary windings 31 and 32 are provided with adjusting taps 33 and 34 for varying the voltage of the rectifier, and the secondary windings comprise four sections 35, 36, 37 and 38 instead of two and which also are provided with adjustable taps 39, for varying the voltage of the rectifier. Furthermore, four tubes 41, 42, 43 and 44 and six reactance coils 45, 46, 47, 48, 49, and 51 are employed instead of the two tubes and four reactance coils, as in the previously described modification. There are also provided four auxiliary windings 52, 53, 54 and 55 instead of two, one for energizing the filament of each tube. The principles of construction of this larger rectifier are the same as the smaller one. The transformer windings are shielded in the same manner and the reactance coils are provided with grounded short circuited shields 56, 57, 58, 59, 61 and 62 which are similar to and function in the same manner as shields 26, 27, 28 and 29.

From the negative terminal of this rectifier one circuit extends through reactance coil 48, tube 43, winding 54, winding 37, reactance coil 46, tube 44, winding 55, winding 38 and reactance coil 49 to the positive terminal, and the other through reactance coil 47, tube 41, winding 52, winding 35, reactance coil 45, tube 42, winding 53, winding 36 and reactance coil 51 to the positive terminal.

In order to simplify the assembly of the rectifier, the permeable core of the transformer and the reactance units may be so designed that one of them may be mounted on top of the other and conveniently connected together by a pair of bolts 71 and 72 fitted in plates 73 and 74 positioned above and below the two assembled units. Furthermore, suitable means may be disposed upon the top of the reactance unit as indicated in Fig. 1 for the reception of the tubes and the terminals of the rectifier.

It will be understood by those skilled in the art that the tubes referred to in this specification are the well known Fleming type electron discharge tubes, but that their use is not critical to the operation of the invention as any other valve mechanism having similar characteristics may be employed in the rectifying circuits in their place.

While we have illustrated our invention in the preferred forms it is to be understood that it is susceptible to various modifications by those skilled in the art, and that the claims are to be construed as to cover all such modifications.

We claim:

1. An alternating current rectifying device, comprising a current transformer having a secondary winding divided into two sections, an electron discharge valve connected in current rectifying circuit relation with each section of said transformer secondary windings, and a plurality of reactance coils for damping out fluctuations in the direct current produced by the rectifier, said reactance coils, said valves and said transformer secondary windings being connected in a plurality of rectifying circuits, each of which extends from a negative terminal of the rectifier in series through one of said coils, one of said valves, one of the sections of the transformer secondary windings and a second of said reactance coils to a positive terminal of the rectifier.

2. An alternating current rectifying device, comprising a current transformer having electrostatically shielded primary and secondary windings, said windings being divided in a plurality of sections and mounted upon a permeable core, a rectifier valve for each section of said secondary winding, and a plurality of electrostatically shielded reactance coils for damping out the fluctuations in the direct current passing through the rectifier, said valves, said transformer secondary windings, and said reactance coils being connected in a plurality of parallel circuits each of which extends from a negative terminal of the rectifier through one of said reactance coils, through one of said valves, through one section of said transformer secondary winding and through another of said reactance coils to a positive terminal of the rectifier.

3. An alternating current rectifying device, comprising a current transformer having a plurality of sections of electrostatically shielded primary and secondary windings, a plurality of electron discharge valves for rectifying the current passing through the transformer, one valve being provided for each section of said secondary winding, and a plurality of reactance coils concentrically mounted upon a common permeable core for damping out the fluctuations in the direct current passing through the rectifier, each of said reactance coils being electrostatically shielded by a continuous shield forming a short circuited secondary winding and grounded to the core upon which the coils are mounted; said valves, said transformer secondary windings and said reactance coils being connected in a plurality of parallel circuits each of which circuits extends from a negative terminal on the rectifier in series through one of said reactance coils, one of said valves, one of the sections of said transformer secondary winding and another of said reactance coils to the positive terminal on the rectifier.

4. An alternating current rectifying device, comprising a current transformer having a plurality of sections of electrostatically shielded primary and secondary windings, a plurality of electron discharge valves for rectifying the current passing through the transformer, one valve being provided for each section of said secondary winding, a plurality of auxiliary transformer secondary windings for energizing said electron discharge valve, and a plurality of reactance coils for damping out fluctuations in the direct current provided by the rectifier; said valves, said transformer secondary windings, said auxiliary secondary windings and said reactance coils being connected in a plurality of parallel circuits each of which circuits extends from a negative terminal of the rectifier through one of said reactance coils, one of said valves, one of said auxiliary secondary transformer windings, one section of said transformer secondary windings and a second reactance coil to a positive terminal on the rectifier.

5. An alternating current rectifying device, comprising a current transformer having a plurality of sections of primary and secondary windings, a plurality of electron discharge valves for rectifying the current passing through the transformer, one valve being provided for each section of said secondary winding, and a plurality of reactance coils concentrically mounted upon a common permeable core for damping out the fluctuations in the coils and being electrostatically shielded by shields grounded to the core upon which the coils are mounted; said valves, said transformer secondary windings and said reactance coils being connected in a plurality of parallel circuits each of which circuits extends from a negative terminal on the rectifier through one of said reactance coils, one of said valves, one of the sections of said transformer secondary winding and another of said reactance coils to the positive terminal on the rectifier; and said reactance coils being arranged upon said permeable core and in said circuits in such a way that they normally produce a common magnetic field having all the lines of force flowing in one direction about the core upon which they are mounted whereby any tendency of a current to flow in any of said coils in a direction opposite to its intended direction is effectively resisted.

6. The combination in device for converting alternating current into direct current, of a source of alternating current, a plurality of electron discharge rectifier valves each having an anode and a cathode and having a plurality of reactance coils, said valves, said reactance coils and said source of alternating current being connected in a plurality of parallel circuits in each of which a reactance coil is connected to the anode of each valve in each circuit, the source of alternating current is connected to the cathode of each valve, and a reactance coil is connected in series circuit relation with said source of alternating current.

In testimony whereof, we hereunto sign our names.

CHARLES B. BARTLEY.
VIRGIL H. DAKE.